March 29, 1927.
C. WILHJELM
VALVE
Filed Nov. 24, 1925
1,622,406
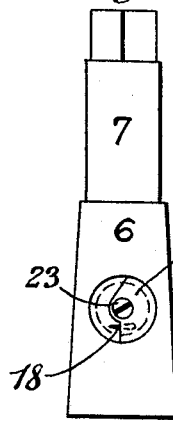
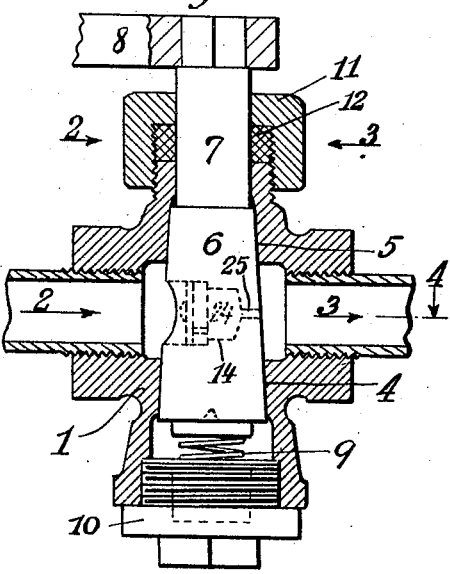
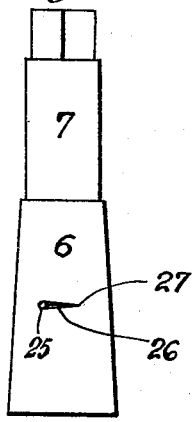
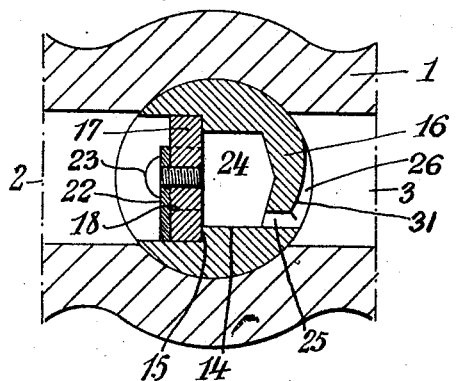
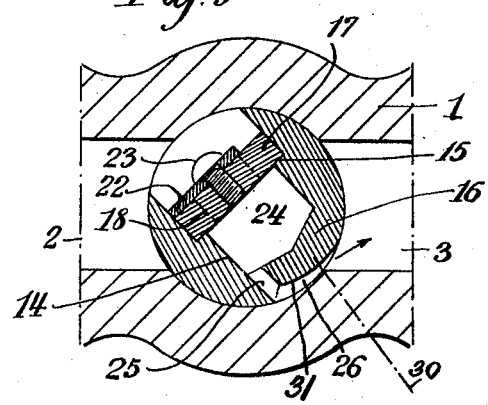
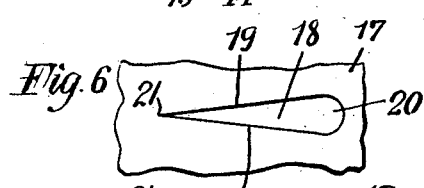
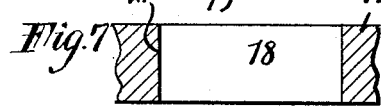
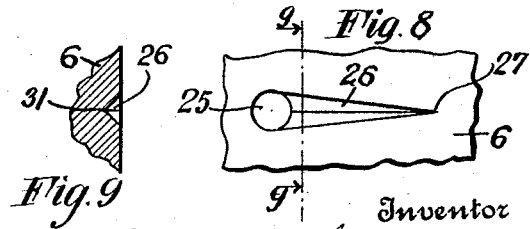
Inventor
Christian Wilhjelm
By his Attorney Patented Mar. 29, 1927.

1,622,406

UNITED STATES PATENT OFFICE.

CHRISTIAN WILHJELM, OF PHILADELPHIA, PENNSYLVANIA.

VALVE.

Application filed November 24, 1925. Serial No. 71,065.

This invention relates to improvements in valves used especially in connection with burners for heating furnaces.

The object of the invention is to provide a generally improved valve for the purpose set forth embodying certain novel features of construction specially designed to provide very fine and accurate adjustment and arranged to prevent clogging of the valve by impurities contained in the oil.

Accordingly my invention is embodied in a valve mechanism comprising such novel features of construction and arrangement as are hereinafter set forth, while reference is had to the accompanying drawings in which—

Figure 1 is a central sectional view of a valve embodying the invention with parts broken away.

Figure 2 is a view of the valve plug looking in the direction of arrow 2 in Figure 1.

Figure 3 is a view of the valve plug looking in the direction of arrow 3 in Figure 1.

Figure 4 is a horizontal sectional view of the valve mechanism on line 4—4 of Figure 1, parts being broken away.

Figure 5 is a view similar to Figure 4 but shows the parts in a different position.

Figure 6 is a detail view of the valve plug inlet orifice.

Figure 7 is a horizontal sectional view of the inlet orifice channel.

Figure 8 is a detail view of the valve plug outlet.

Figure 9 is a sectional view thereof on line 9—9 of Figure 8.

Referring first to Figures 1 to 7 the reference numeral 1 denotes a valve body having an inlet 2 and an outlet 3. The body is provided with tapered valve seats 4 and 5 against which is seated a tapered valve plug 6 having a cylindrical stem 7. To the latter is secured a suitable operating means 8 for rotating the valve plug as is obvious. The plug is seated by means of a spring 9. The lower portion of the valve body is closed by a plug 10, and a nut 11 with a stuffing box 12 closes the upper portion of the valve body.

The plug is bored so that fuel oil, for instance, may pass from the inlet 2 to the outlet 3 in the usual manner. The specific improvements according to this invention reside in the construction of the valve plug whereby very fine adjustment may be obtained to control the passage of the fuel oil through the valve.

The valve plug 6 is bored out to provide a recess 14 having a shoulder 15. The recess extends from the inlet side of the plug to within a short distance from the other side, so that at the bottom of the recess there is formed a relatively thin wall 16.

The numeral 17 denotes a disk which is driven into the recess 14 to fit tightly and practically irremovably against the shoulder 15 and whereby there is formed within the valve plug an oil chamber 24.

In the disk 17, Figures 6 and 7, there is provided an inlet opening 18 having upper and lower walls 19, 19 tapering from a semi-circular opening 20 to a point 21.

On the inlet side of the disk 17 is mounted a shutter 22 adjustable circumferentially on the disk 17 by means of a screw 23.

The outlet side of the plug 6 is provided with a smaller circular outlet 25 which ends in or communicates with a V-shaped tapered channel or cut 26 ending in a point 27, see Figures 8 and 9, and extending for a short distance in the annular surface of the plug.

Figure 4 shows the valve plug fully open. The oil passes from inlet 2 through the plug inlet 18 and into the chamber 24. Then through the outlet 25 and groove 26 to outlet 3 and out.

While in this position, the flow of the oil may be regulated by disconnecting the valve and adjusting the shutter 22 to cut off more or less of the plug inlet opening 18, and in this manner the pressure of the oil may be reduced within the chamber 24 and the volume passing through inlet 18 may be adjusted.

The peculiar form of the outlet opening 25—26 provides a means for very fine adjustment of pressure and volume of oil passing therethrough. As seen in Figure 5, the valve plug has been turned so that the effective outlet opening is in the form of a triangular area across the channel 26 on the line 30. It will further be obvious that by rotating the valve plug still farther in a clockwise direction, the effective opening may be reduced to almost nothing at the point 27 of the groove 26.

It will therefore be apparent that this invention provides a valve construction in which the pressure may be regulated from the inlet side and into the valve chamber 24 and then regulated still further at the outlet by properly adjusting the valve rotatably on its seat. Again it is apparent that either the inlet or outlet may be regulated independently or together.

For all practical purposes, where oil is used as a fuel under pressure, the quantity to be controlled with one valve is very small. The pipe line in which these valves are installed is seldom more than 1/2" in diameter. Under such conditions, it is generally found that the orifice of the valve used in such a line for controlling the oil supply to one or more burners must be reduced to 1/8", 1/16", 1/32" or 1/64" diameter before said orifice begins to reduce the flow of the oil. In other words, the orifice of the control valve must be reduced to a smaller area than the opening in the burner tip, or if there is more than one burner, the control valve area must be below the combined area of all the burner tips fed from the same control valve.

An ideal valve for this purpose would be a valve having an orifice in the circular shape that could be reduced gradually from 1/8" diameter to 1/64" diameter, or less. Such a valve might be provided, but is difficult to regulate and keep clean under ordinary every day operating circumstances, but by the construction here described a triangular opening will always be obtained to eliminate entire clogging of the valve.

Where an inlet or outlet is merely in the form of a square or rectangular opening as ordinarily used in plug type valves, a fine adjustment is practically impossible.

When a very fine adjustment is required a needle valve has heretofore been used. In that case, minute particles of impure matter in the oil will very quickly clog the opening in a needle valve when adjusted to its minimum limit, and, even though such an opening is enlarged to free it from dirt, it is often difficult to accomplish this without increasing the opening far beyond the maximum flow required, which is objectionable in case the valve is adjusted between minimum and maximum position by some predetermined fixed movement, it being kept in mind that in the case of the valve controlling the supply to oil burners, the openings required are very small.

It has also been found that when the valve is clogged up, a slight turn backwards immediately causes a greater flow of oil through the channel which is thus instantly swept clean.

The bottom 31 of the groove 26 is curved eccentrically to the surface of the plug to provide a gradual regulation of the effective outlet area across the groove by a mere rotation of the valve. In most cases, probably, the valve will be adjusted so that the oil issues at the point 27 of the groove to provide the necessary minimum volume and reduced pressure from that at which the oil is fed to the valve.

I claim:—

1. A valve mechanism comprising a valve body providing an inlet and an outlet, a valve plug seated in said valve body and having a pressure reducing chamber formed within said plug and provided with a plug inlet and outlet adapted to communicate with the said body inlet and outlet respectively, a shutter on said valve plug for adjusting the said plug inlet, the said plug outlet being in the form of a channel leading from the said pressure chamber to an eccentrically formed groove in the surface of the plug substantially as and for the purpose set forth.

2. A valve mechanism comprising a valve body providing an inlet and an outlet, a valve plug seated in said valve body, means providing a passage through said valve plug from the said inlet to the said outlet and comprising a substantially triangularly shaped inlet opening, leading to a pressure chamber formed within said plug, a plug outlet leading from said chamber to the said valve body outlet, said plug outlet comprising a cylindrical channel leading from said chamber to a groove cut in the surface of the said plug, said groove extending a distance circumferentially of the valve plug and having angularly disposed walls tapering from the said channel to a point on the surface of the plug.

CHRISTIAN WILHJELM.